(12) United States Patent
Van Dam et al.

(10) Patent No.: US 8,051,710 B2
(45) Date of Patent: Nov. 8, 2011

(54) METHOD AND APPARATUS FOR BALANCING A ROTOR

(75) Inventors: Jeremy Daniel Van Dam, West Coxsackie, NY (US); Christopher Anthony Kaminski, Schenectady, NY (US); Blake Weldon Wilson, Scotia, NY (US)

(73) Assignee: General Electric Company, Niskayuna, NY (US)

( * ) Notice: Subject to any disclaimer, the term of this patent is extended or adjusted under 35 U.S.C. 154(b) by 817 days.

(21) Appl. No.: 11/946,316

(22) Filed: Nov. 28, 2007

(65) Prior Publication Data

US 2009/0133494 A1 May 28, 2009

(51) Int. Cl.
    *G01M 1/16* (2006.01)
(52) U.S. Cl. .......................................... 73/468; 310/262
(58) Field of Classification Search .................... 73/460, 73/66, 457, 458, 469; 74/1 R; 310/262
    See application file for complete search history.

(56) References Cited

U.S. PATENT DOCUMENTS

| | | | |
|---|---|---|---|
| 3,330,031 A | 7/1967 | Rediger et al. | |
| 4,064,762 A | 12/1977 | Wikner | |
| 4,933,583 A * | 6/1990 | Ripplinger | 310/156.22 |
| 5,214,585 A | 5/1993 | Ehrich | |
| 5,666,015 A * | 9/1997 | Uchibori et al. | 310/51 |
| 6,147,428 A * | 11/2000 | Takezawa et al. | 310/156.57 |
| 6,700,288 B2 * | 3/2004 | Smith | 310/216.023 |
| 7,342,331 B2 * | 3/2008 | Down et al. | 310/51 |
| 7,626,309 B2 * | 12/2009 | Watson | 310/216.023 |
| 7,717,013 B2 * | 5/2010 | Hildebrand et al. | 74/574.2 |
| 2006/0005623 A1 * | 1/2006 | Hildebrand et al. | 73/468 |
| 2007/0090701 A1 * | 4/2007 | Down et al. | 310/51 |
| 2009/0066174 A1 * | 3/2009 | Watson | 310/51 |

* cited by examiner

*Primary Examiner* — Hezron E Williams
*Assistant Examiner* — Samir M Shah
(74) *Attorney, Agent, or Firm* — Andrew J. Caruso

(57) ABSTRACT

A midlength balanced rotor comprises a rotor assembly for rotation about an axis of rotation defining at least one of an axially extended, radially concentric, centerline borehole; an array of radially or tangentially distributed, axially extended pockets; and a series of radially or tangentially distributed, axially extended slots. At least one balance weight is positioned within at least one of the axially extended, radially concentric, centerline borehole, the array of radially or tangentially distributed, axially extended pockets, or the radially or tangentially distributed, axially extended slots to balance the rotor assembly. Alternatively, at least one balance correcting mass is removed from at least one of the axially extended, radially concentric, centerline borehole, the array of radially or tangentially distributed, axially extended pockets, or the radially or tangentially distributed, axially extended slots to balance the rotor assembly. In addition, a method of midlength balancing a rotor comprises the steps of providing a rotor assembly with at least one of an axially extended, radially concentric, centerline borehole; an array of radially or tangentially distributed, axially extended pockets; and a series of radially or tangentially distributed, axially extended slots; rotating the rotor shaft about an axis of rotation; determining unbalance of the rotor shaft; and adding or removing weight to at least one of said an axially extended, radially concentric, centerline borehole; array of radially or tangentially distributed, axially extended pockets; or series of radially or tangentially distributed, axially extended slots, to balance the rotor shaft.

19 Claims, 3 Drawing Sheets

METHOD AND APPARATUS FOR BALANCING A ROTOR

BACKGROUND

The invention relates generally to methods and apparatus for balancing a rotor and more specifically to methods and apparatus for midlength balancing of a rotor.

A rotating body will not exert any variable disturbing force on its supports when the axis of rotation coincides with one of the principal axes of inertia of the body. This condition is quite difficult to achieve in the normal process of manufacturing since due to errors in geometrical dimensions and non-homogeneity of the material, some irregularities in the mass distribution are always present.

As a result of the above, variable disturbing forces occur which produce vibrations. To remove these vibrations and establish safe and quiet operation, balancing becomes necessary. The importance of balancing becomes especially great in the case of high-speed machines, for example a turbine rotor or electric machinery that operates at speeds typical of turbomachinery. In such cases the slightest unbalance may produce a very large disturbing force.

The proper balancing of certain rotors, particularly for high-speed applications, requires unbalance correction not just in the end regions of the rotor but also in the midlength of the rotor body. Common rotor architectures, especially in high-speed applications, make use of an outer shell of material that is highly stressed. This highly stressed material cannot tolerate the stress concentrations caused by weight-addition or weight-removal features typically used for balancing. Accordingly, the only locations available for balancing rotors of this configuration have traditionally been in the end regions of the rotor where the materials are not as highly stressed. With correction planes available only in the end regions, the speed range over which a rotor can be successfully operated in without rotor dynamic instability is limited.

The typical solution is to design a rotor with high enough stiffness such that the residual unbalance of the unit can be corrected in locations on either end of the rotor body. This effectively restricts the size and speed that a rotor can operate. If a design must operate in a regime where mid-length rotor balancing is required, then sub-component and sub-assembly balancing techniques can be employed to limit the potential unbalance of the full assembly. This approach has limited effectiveness, as it does not address the unbalance caused during the assembly process. The ability to correct the rotor balance at axial locations between the end regions after it is assembled can enable the rotor to operate at higher speeds without experiencing instability issues.

The process by which a typical high-speed rotor is balanced requires access to the balance correction locations. For a traditional balancing scheme, correction masses are added or removed from available end regions. Access to these regions is often restricted by the rotor support structure and the non-rotating machine components. Because of access restrictions, the balancing operations are often conducted before the rotor is assembled to the machine. Future balance correction for machines of this nature require significant disassembly to gain access to the balance correction locations. End-wise access to balance correction locations can enable rotor balancing on a machine that is nearly fully assembled, ideally requiring access to only one end of the rotor. Future balance correction can be enabled in this way without significant machine disassembly.

Accordingly, there is a need for an improved rotor balancing method and apparatus, especially for midlength rotor balancing.

BRIEF DESCRIPTION

A midlength balanced rotor comprises a rotor assembly for rotation about an axis of rotation defining at least one of an axially extended, radially concentric, centerline borehole; an array of radially or tangentially distributed, axially extended pockets; and a series of radially or tangentially distributed, axially extended slots. At least one balance weight is positioned within at least one of the axially extended, radially concentric, centerline borehole, the array of radially or tangentially distributed, axially extended pockets, or the radially or tangentially distributed, axially extended slots to balance the rotor assembly. Alternatively, at least one balance correcting mass is removed from at least one of the axially extended, radially concentric, centerline borehole, the array of radially or tangentially distributed, axially extended pockets, or the radially or tangentially distributed, axially extended slots to balance the rotor assembly. In addition, a method of midlength balancing a rotor comprises the steps of providing a rotor assembly with at least one of an axially extended, radially concentric, centerline borehole; an array of radially or tangentially distributed, axially extended pockets; and a series of radially or tangentially distributed, axially extended slots; rotating the rotor shaft about an axis of rotation; determining unbalance of the rotor shaft; and adding or removing weight to at least one of said an axially extended, radially concentric, centerline borehole; array of radially or tangentially distributed, axially extended pockets; or series of radially or tangentially distributed, axially extended slots, to balance the rotor shaft.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figures 1, 2:
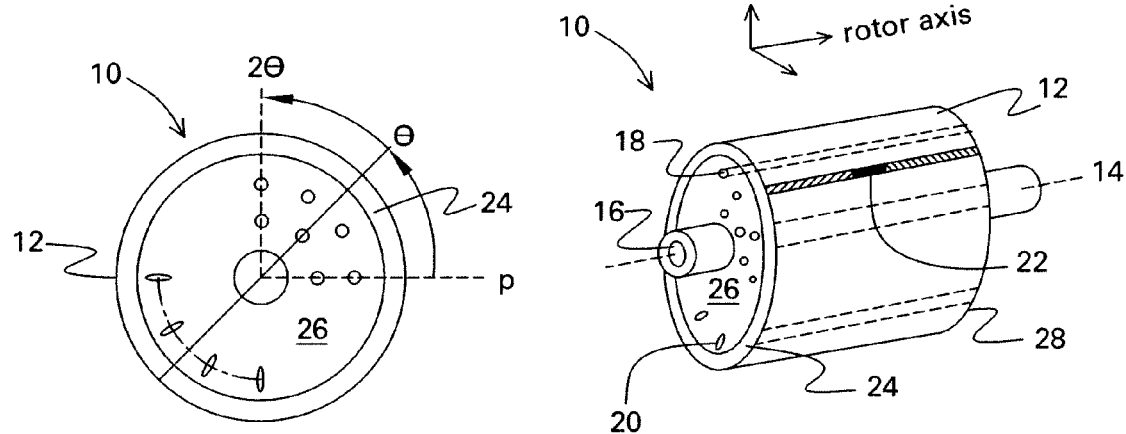
FIG. 1 is a schematic illustration of one embodiment of the instant invention.
FIG. 2 is a schematic illustration of another embodiment of the instant invention.

A midlength balanced rotor 10 comprises a rotor assembly 12 for rotation about an axis of rotation 14 defining at least one of an axially extended, radially concentric, centerline borehole 16, an array of radially or tangentially distributed, axially extended pockets 18, and a series of radially or tangentially distributed, axially extended slots 20, and at least one balance weight 22 disposed within at least one of the borehole 16, a respective pocket 18, or a respective slot 20, is shown in FIGS. 1 and 2.

As discussed above, common rotor architectures, especially in high-speed applications, make use of an outer shell 24 of material that is highly stressed. This highly stressed material cannot tolerate the stress concentrations caused by weight-addition or weight-removal features typically used for balancing. Accordingly, the only locations available for balancing rotors of this configuration have traditionally been in the end regions 26, 28 of the rotor assembly 12 where the materials are not as highly stressed. Machines that can only be balanced outboard of the rotor body will inherently have some residual unbalance through the rotor body length. If this unbalance cannot be corrected it must be addressed by use of rotor support bearings that are carefully designed for a given operating speed range. This often requires complex bearing mechanisms to provide a specific stiffness and damping. The stable operating speed range of the unit will then be limited by the characteristics of the rotor bearing system.

In this embodiment, however, due to the configuration including axially extended pockets 18 or slots 20, balance correcting weights 22 can be introduced from the end regions 26, 28 and can be positioned at predetermined axial, radial and tangential positions to correct the residual unbalance within the rotor assembly 12.

As shown in FIG. 1 and FIG. 2, a center borehole 16 and a plurality of axial extended pockets 18 or slots 20 are defined within the body of rotor assembly 12. Typically, the borehole 16, pockets 18, and slots 20 are machined into the rotor assembly 12. In one embodiment, the pockets 18 and slots 20 extend axially from one end region to the opposite end region. In an alternative embodiment, a portion of the pockets 18 or slots 20 extend axially partway from one end region.

Typically, the pockets 18 or slots 20 are radially disposed at predetermined distances from the centerline 14 to provide varied radial positioning for the balance correcting weights 22. Additionally, the pockets 18 or slots 20 are tangentially distributed about the body of the rotor assembly at predetermined angles from a reference point (p). As shown in exemplary fashion in FIG. 2, a series of pockets or slots are tangentially distributed at an angle θ from reference point p and a second series of pockets or slots are tangentially distributed at a different angle, for example, 2θ from reference point p.

Figure 3:
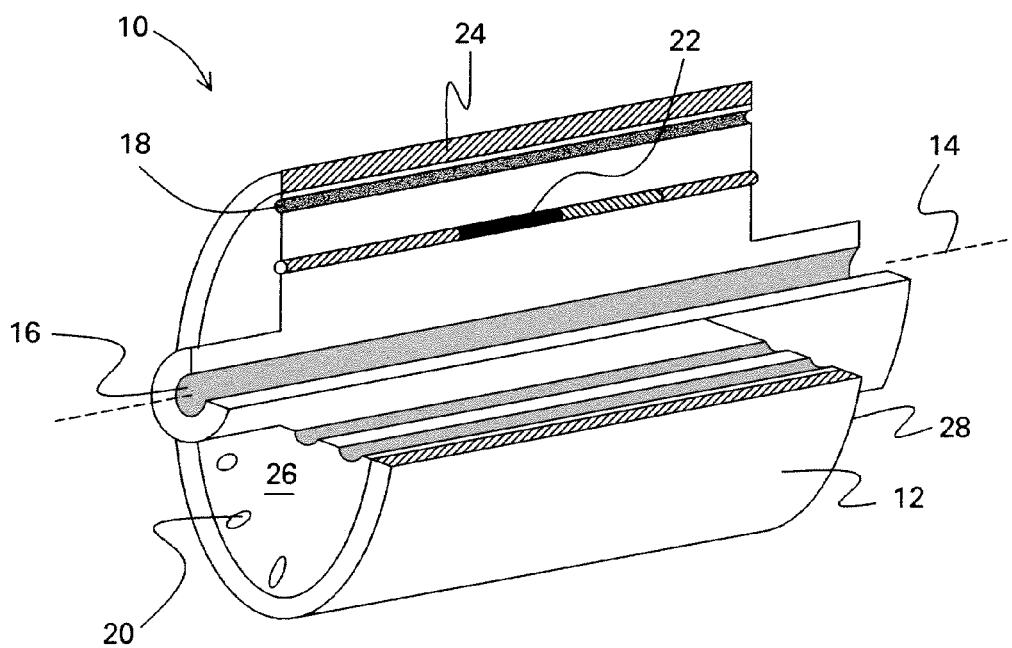
FIG. 3 is a partially perspective cutaway view of another embodiment of the instant invention.

FIG. 3 is a perspective view of midlength balanced rotor 10 as discussed in reference to FIGS. 1 and 2. As shown, by selectively placing at least one balance correcting weight 22 into a predetermined pocket 18 or slot 20, residual unbalance can be corrected within the rotor assembly 12. The ability to correct the rotor balance at axial locations between the end regions 26, 28 post-assembly, as contemplated with the instant invention, enables significantly higher rotor operating speeds without experiencing instability issues. Additionally, rotor assemblies 12 with higher aspect ratios, (long rotors with comparatively small diameters), can be made to operate at higher speeds without detrimental effects caused by rotor-dynamic instability. By utilizing the instant invention, rotor assemblies 12 can therefore be produced for a given power rating in a smaller size and lower weight, effectively increasing power density. Furthermore, by utilizing the instant invention, the quality of the balance correction procedure is improved such that the loads experienced by the rotor from unbalance are reduced, thereby improving the reliability of the system.

Figure 4:
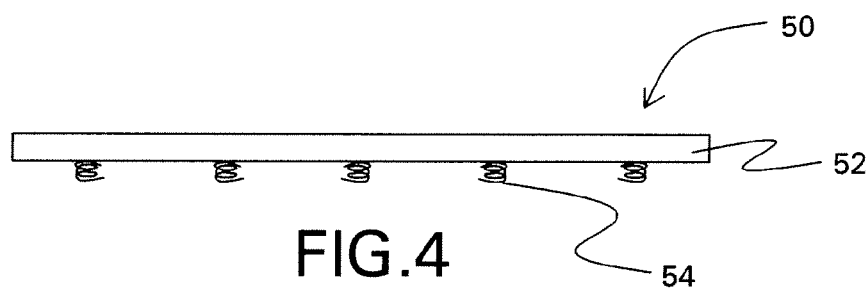
FIG. 4 is a schematic illustration of another embodiment of the instant invention.

One embodiment of a balance correcting weight 50 is shown in FIG. 4. Balance correcting weight 50 comprises a longitudinal bar 52 and a plurality of springs 54 attached to the bar 52. Balance correcting weight 50 can be made of a variety of materials, having a variety of specific densities and a variety of dimensions to allow for proper balancing within one of the plurality of axial extended pockets 18 or slots 20. The balance correcting weight 50 is positioned in the appropriate location within one of the pocket 18 or slot 20, and the springs 54 engage the sidewalls of the pockets 18 or slot 20 and keep the bar 52 in place during rotation. In an exemplary embodiment, balance correcting weight 50, or any of the balance correcting weights discussed herein, can comprise high specific density materials such as copper, lead or steel or the like or low specific density materials such as garolite composite, aluminum, or a high temperature polymer or the like, or combinations of high specific density materials and low specific density materials.

Figure 5:
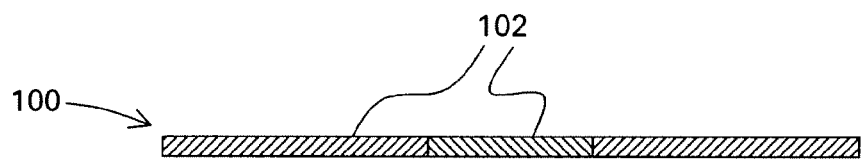
FIG. 5 is a schematic illustration of another embodiment of the instant invention.

Another embodiment of a balance correcting weight 100 is shown in FIG. 5. Balance correcting weight 100 comprises a plurality of individual bar lengths 102. Each bar length 102 can comprise a different material comprising a different specific density and a different shape. Accordingly a series of bar lengths 102 of a variety of materials, for example plastic, metal or other materials, of a predetermined cross sectional dimension can be introduced axially into at least one of the center borehole 16 a respective pocket 18 or slot 20 to appropriately balance the rotor assembly 12. The length and type of bar materials can be changed as necessary to adjust the balance of the rotor assembly 12 as well as the location and overall positioning of a respective bar length 102.

Figure 6:
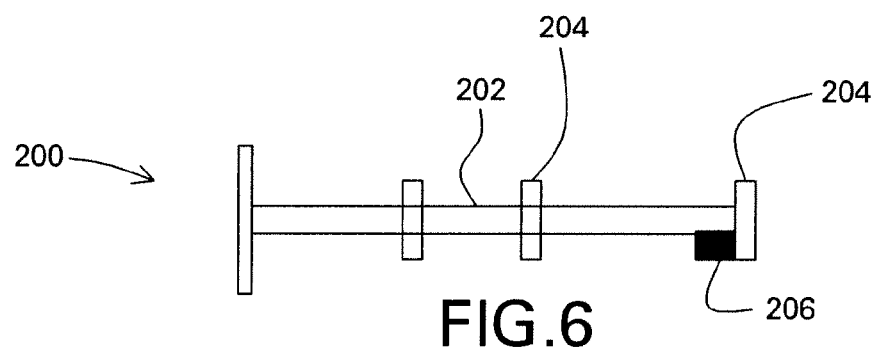
FIG. 6 is a schematic illustration of another embodiment of the instant invention.
Figure 7:
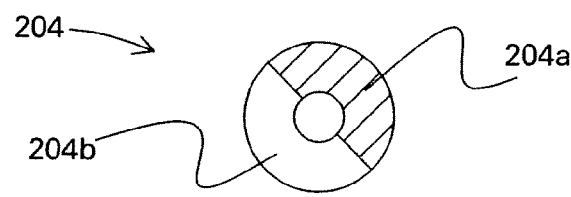
FIG. 7 is a schematic illustration of another embodiment of the instant invention.

Another embodiment of a balance correcting weight 200 is shown in FIG. 6. Balance correcting weight 200 comprises a longitudinal shaft 202 and a plurality of axially distributed plates 204 that are attached to longitudinal shaft 202. The distributed plates 204 can be welded or otherwise permanently positioned on longitudinal shaft 202 or alternatively can be slideably positioned on the longitudinal shaft 202 and fixed in place with a set screw or the like (not shown). In one embodiment, at least one distributed plate 204 is appropriately axially positioned to adjust the balance of the rotor assembly 12. Additionally, masses 206 can be attached to the distributed plates 204 or to the longitudinal shaft 202 at specific axial, angular and radial locations to adjust the balance of the rotor assembly 12. A plate 204 can be fashioned such that it contains more mass on one side 204*a* than on an opposite side 204*b* if required for appropriate balancing, as shown in FIG. 7.

Figure 8:
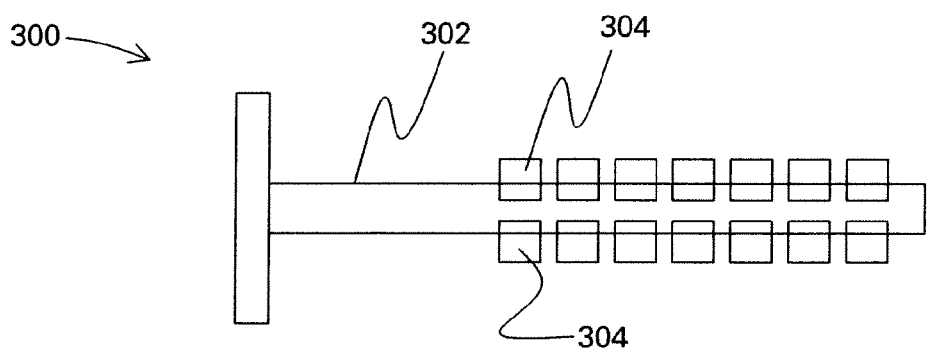
FIG. 8 is a schematic illustration of another embodiment of the instant invention.

Another embodiment of a balance correcting weight 300 is shown in FIG. 8. Balance correcting weight 300 comprises a longitudinal shaft 302 and a plurality of selectable weights 304 that fit about the longitudinal shaft 302. The selectable weights 304 can comprise a variety of materials, having a variety of specific densities and a variety of dimensions. In one embodiment, at least one balance correcting weight 304 is appropriately axially positioned to adjust the balance of the rotor assembly 12. In certain embodiments, respective selectable weights 304 are appropriately exchanged with weights made of different materials having correspondingly different specific densities to balance the rotor assembly 12.

Figure 9:
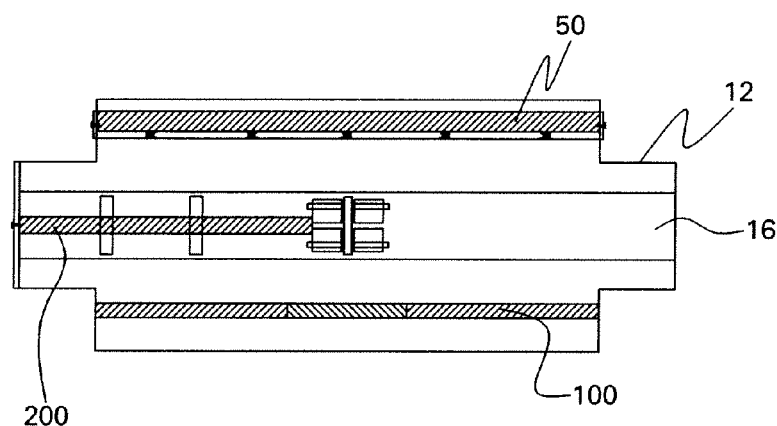
FIG. 9 is a schematic illustration of another embodiment of the instant invention.

FIG. 9 depicts a number of the embodiments discussed above fitted within an exemplary rotor assembly 12. For example, balance correcting weight 50, balance correcting weight 100 and balance correcting weight 200 are each depicted. Each respective balance correcting weight is positioned in the appropriate location within one of the center borehole 16, a pocket 18 or a slot 20 to adjust the balance of the rotor assembly 12.

Figure 10:
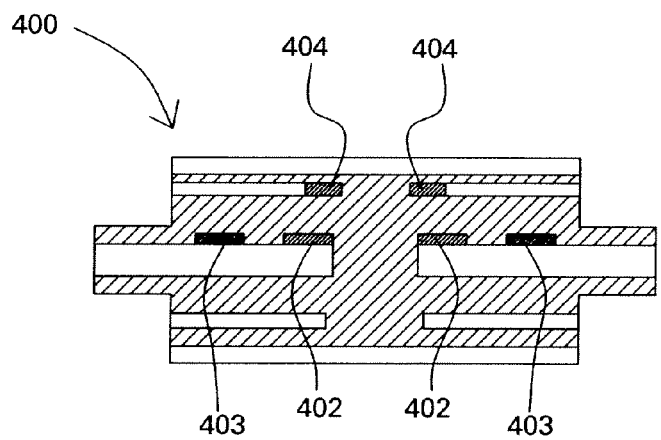
FIG. 10 is another schematic illustration of another embodiment of the instant invention.

FIG. 10 depicts another embodiment of the instant invention 400. In this embodiment, in addition to all of the balance correcting weights discussed above, the rotor assembly 12 includes certain portions of removable material 402, 403, 404 that can be used to balance the rotor assembly. For example, certain portions of the borehole 16, pockets 18, and slots 20 are removable to assist in the balancing of the rotor assembly 12 by machining, drilling or otherwise removing portions of the removable materials 402, 403, 404 therefrom.

Material can be removed selectively from various axial locations such as shown by portion 402 or portion 403 and from various radial locations such as shown by portions 402 or 404. Material can be removed selectively from various angular locations shown in FIG. 11 at an angle 2θ from reference point p. By selectively removing mass from various axial, radial and angular locations the appropriate balance correction of the rotor can be achieved.

Figure 11:
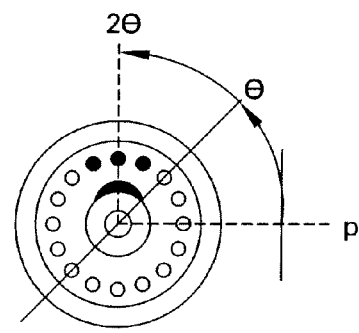
FIG. 11 is another schematic illustration of another embodiment of the instant invention.

It is possible that in practice a balance correction is needed at a specific angle such as 2θ in FIG. 11, and that a greater amount of weight addition or removal is required than what is available at that specific angular location in the borehole 16, pockets 18, or slots 20. Additional weight addition or removal can be applied at neighboring locations to the desired angle 2θ to achieve the desired net resulting weight addition or removal, as demonstrated in FIG. 11.

Any conventional or future method of determining the unbalance of a rotor can be utilized. The most common method used to balance rotating assemblies is known as the Influence Coefficient Method. This method requires balance planes, which are typically located at anti-nodes of rotor vibration for the mode of interest. Balance planes allow one to either add or remove mass at known radius locations changing the state of rotor imbalance. The influence coefficient method uses the change phase relationship between the imbalance vector and vibration vector and also vibration magnitudes to determine the balance state. The required amount of mass at corresponding balance planes and the circumferential location at the balance planes can be determined through three different runs: (1) baseline run, (2) run with trial masses, (3) run with correction masses. The quality of the final balance state is limited by the locations available for mass correction. In one example, trial masses are placed arbitrarily on the rotor and the rotor is spun at a predetermined speed or at multiple speeds. The effects of the trial mass and its location are evaluated by the change in unbalance force response. After this step is completed using multiple masses in multiple locations at one or more speeds, the effective changes in unbalance from these trials is used to calculate the influence coefficients. Various algorithms are then used to determine the optimal placement of balance correction masses, both in magnitude and location. The quality of the final balance state is limited by the locations available for mass correction.

The theoretical limit of such an approach, given infinite balance location availability, is a perfect state of balance at all speeds. It is therefore advantageous to maximize the available locations to evaluate and correct unbalance, as discussed in this invention.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A high-speed machine comprising:
bearings;
a stator; and
a high-speed, midlength balanced rotor assembly for rotation about an axis of rotation defining an axially extended, radially concentric, centerline borehole and an array of radially or tangentially distributed, axially extended pockets or slots; and
at least one balance correcting weight disposed within said axially extended, radially concentric, centerline borehole and at least one other balance correcting weight disposed within said array of radially or tangentially distributed, axially extended pockets or slots;
wherein said at least one balance correcting weight disposed within said axially extended, radially concentric, centerline borehole and at least one other balance correcting weight disposed within said array of radially or tangentially distributed, axially extended pockets or slots are provided to the high-speed, midlength balanced rotor assembly after the bearings and the stator have been added to the high-speed machine.

2. A high-speed machine in accordance with claim 1, wherein said rotor is a turbine rotor.

3. A high-speed machine in accordance with claim 1, further comprising an outer shell surrounding said midlength balanced rotor.

4. A high-speed machine in accordance with claim 1, wherein said axially extended pockets or slots are defined within the body of said rotor assembly.

5. A high-speed machine in accordance with claim 1, wherein said axially extended pockets or slots are machined into said rotor assembly.

6. A high-speed machine in accordance with claim 1, wherein said axially extended pockets or slots extend axially from one end region of said rotor to the opposite end region of said rotor.

7. A high-speed machine in accordance with claim 1, wherein said pockets or slots are radially disposed at a predetermined distance from a centerline of said rotor to provide varied radial positioning for said balance correcting weights.

8. A high-speed machine in accordance with claim 1, wherein said pockets or slots are tangentially distributed about the body of said rotor assembly at predetermined angles from a reference point.

9. A high-speed machine in accordance with claim 1, wherein said balance correcting weight comprises a longitudinal bar and a plurality of springs attached to the bar.

10. A high-speed machine in accordance with claim 9, wherein said balance correcting weight is positioned in the appropriate location and the plurality of springs engage the sidewalls of the borehole, pocket or slot and keep the bar in place during rotation.

11. A high-speed machine in accordance with claim 9, wherein said balance correcting weight comprises a material having a high specific density such as copper, lead or steel or a low specific density material such as garolite composite, aluminum, or a high temperature polymer, or combinations thereof.

12. A high-speed machine in accordance with claim 1, wherein said balance correcting weight comprises a plurality of individual bar lengths.

13. A high-speed machine in accordance with claim 12, wherein said plurality of individual bar lengths comprise a different material comprising a different specific density or different shape.

14. A high-speed machine in accordance with claim 1, wherein said balance correcting weight comprises a longitudinal shaft and a plurality of axially distributed plates attaches to said shaft.

15. A high-speed machine in accordance with claim 14, wherein at least one of said axially distributed plates comprises multiple portions having different specific densities with respect to one another.

16. A high-speed machine in accordance with claim 14, wherein at least one of said axially distributed plates comprises geometry featuring such that one portion of said plate has greater mass than a second portion of said plate.

17. A high-speed machine in accordance with claim 14, wherein said balance correcting weight further comprises a plurality of masses that are affixable to said axially distributed plates or to said longitudinal shaft at specific axial, angular or radial locations to adjust the balance of said rotor assembly.

18. A high-speed machine in accordance with claim 1, wherein said balance correcting weight comprises a longitudinal shaft and a plurality of selectable weights that fit about said longitudinal shaft.

19. A high-speed machine comprising:
bearings;
a stator;
a high-speed, midlength balanced rotor assembly for rotation about an axis of rotation having an axially extended, radially concentric, centerline borehole; and
at least one balance weight disposed within said axially extended, radially concentric, centerline borehole, wherein the at least one balance weight is provided to the high-speed, midlength balanced rotor after the bearings and the stator have been provided to the high-speed machine.

* * * * *